…

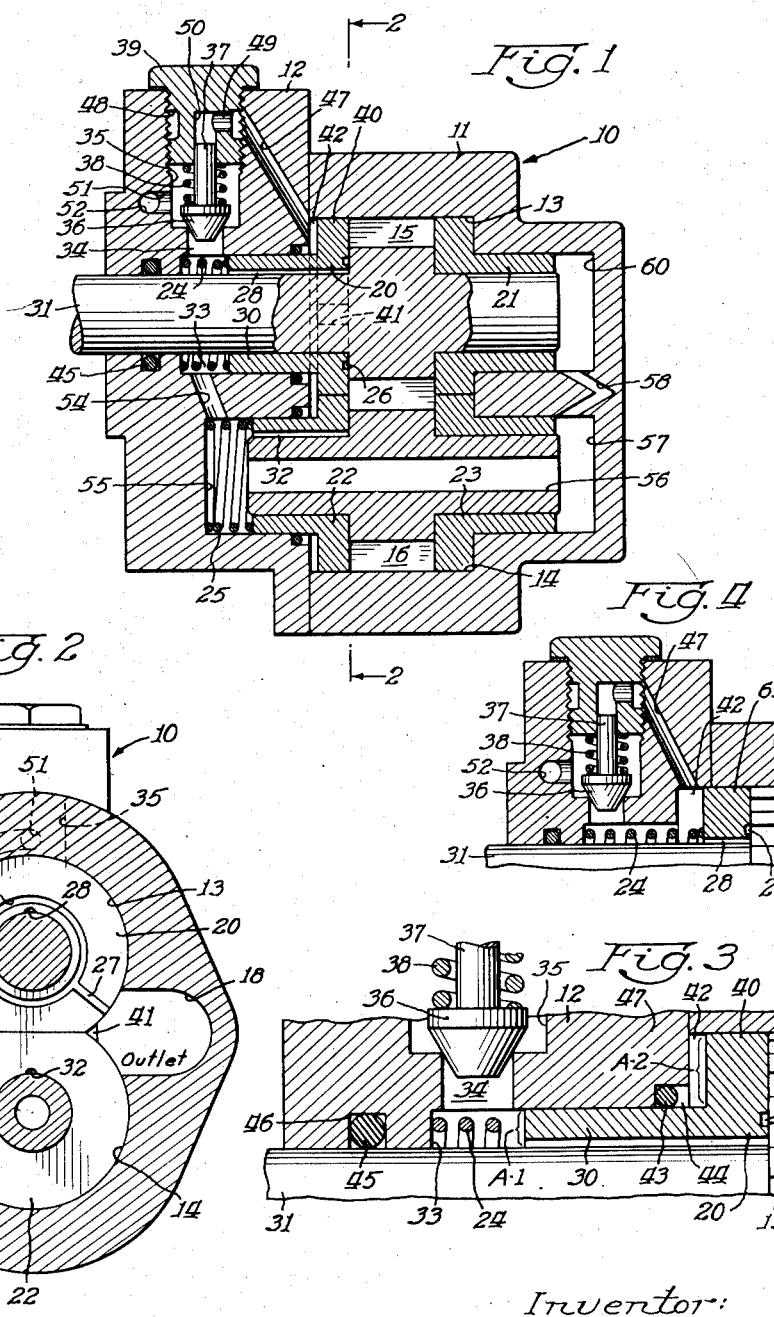

UNITED STATES PATENT OFFICE 2,665,641

PUMP, PRESSURE LOADED, WITH DIFFERENTIAL VALVE

John Alfred Lauck, Shaker Heights, Ohio, assignor to Borg-Warner Corporation, Chicago, Ill., a corporation of Illinois Application June 18, 1949, Serial No. 99,946

10 Claims. (Cl. 103—126)

This invention relates to a high pressure, gear type liquid displacement device having axially adjustable bushings, and particularly to an improved arrangement for maintaining the axially adjustable bearing bushings in pumping seal engagement with the gear side faces.

It has been proposed heretofore to employ the liquid pressure generated by the intermeshing gears of a gear type liquid displacement device for urging the bearing bushings into pumping seal relation with the associated gear side faces, an example of such an arrangement being that disclosed and claimed in Roth and Lauck Patent No. 2,420,622, dated May 13, 1947; the present invention is an improvement thereover.

In the development leading up to the arrangement disclosed in the aforementioned patent, it was found that the pressure loading accomplished by exposing the rear surfaces of the radial flanges of the bearing bushings to the output pressure was not sufficient to maintain the requisite seal between the forward, radially extending surfaces of the bushings and the adjacent side faces of the gears. In accordance with the disclosure of that patent, one means of accomplishing the proper pressure loading comprised relieving the radially, inner terminal of each forward bushing surface by the provision therein of an annular groove of closely controlled, radial extent, said annular groove being vented to low pressure. This arrangement proved highly satisfactory in practice, and the present invention constitutes an alternative method of accomplishing substantially the same result.

An object of the present invention is to provide a new and improved arrangement of the character contemplated in the above-mentioned patent wherein the requisite over-counterbalance of pressure on the bearing bushing in the direction of pumping seal engagement is assured, while at the same time the necessary lubrication is delivered to the relatively moving surfaces.

It is a further object of the present invention to provide an arrangement wherein stagnant conditions of the liquid in any of the pressure areas, and particularly in the area adjacent the outer surface of the radial flange of each bushing, are avoided by providing sufficient circulation of the fluid, while at the same time maintaining adequate pressure.

In accordance with one embodiment of this invention in a pump of the class described, loading pressure tending to hold the bushings, which are flanged in this embodiment, against the gears in sealing relation is applied to two distinct and separate pressure areas at the rear surface of each bushing, one area comprising the annular rear surface of the flanged portion and the second the annular rear surface of the sleeve portion of the bushing. A pressure responsive valve is incorporated in the pump and is constructed and arranged so that a portion of the liquid under pressure being pumped is applied from the first area to the valve stem, tending to hold the valve in closed position, while fluid is applied from the second area to the valve, tending to open the valve. The valve is spring-loaded so as to be normally held in a closed position, and the pressure responsive area of the valve stem is made sufficiently smaller than the area of the valve on which the pressure tending to open the valve acts, so that the valve may open to by-pass fluid from the second area to low pressure upon the loading pressure exceeding a predetermined value.

In accordance with the second embodiment of this invention, a similar valving arrangement is employed in conjunction with solid bushings, that is bushings of the unstepped or unflanged type. In this arrangement, instead of controlling the pressure applied to a restricted rear surface area of the bushing, the valving arrangement controls the pressure applied to the entire rear surface area.

Other objects and advantages of the present invention will be apparent from the following detailed description taken in conjunction with the drawings, wherein:

Fig. 1 is an axial, cross-sectional view of a gear pump in accordance with the first embodiment of this invention, the view being taken substantially along the line 1—1 of Fig. 2;

Fig. 2 is a transverse, sectional view taken substantially along the line 2—2 of Fig. 1;

Fig. 3 is an enlarged, detail, sectional view, similar to Fig. 1, showing the arrangement of passages on the upper side of the upper bearing and their mode of connection to the valve arrangement; and Fig. 4 is a view similar to Fig. 3, but in the same scale as Figs. 1 and 2, showing the present invention as applied to a pump employing solid or unstepped bushings, in accordance with the second embodiment thereof.

Referring now to the drawings, and particularly to Figs. 1, 2 and 3 thereof, it will be seen that a gear-type liquid displacement device 10 is there shown and comprises a pump housing 11 having a closure member 12. Housing 11 and closure member 12 are formed internally to provide a pair of parallel, intersecting bores or chambers 13 and 14 in which are disposed in complementary relationship intermeshing pumping gears 15 and 16. Low pressure liquid is introduced through inlet 17, and high pressure liquid is delivered from outlet 18.

Complementary identical end plate defining means or bearing bushing and pumping seal defining means are associated with the gears for cooperation with the gear side faces on each side thereof; thus, flanged or stepped bearing bushings 20 and 21 are arranged to cooperate with the opposite side faces of the gear 15, while similar bearing bushings 22 and 23 are arranged respectively on the left and right sides of the gear 16. Bushings 21 and 23 are fixed in the housing 11, while bushings 20 and 22 are relatively axially movable therein. Coiled compression springs 24 and 25 are disposed within the left ends of the bores 13 and 14 respectively so as to bear against the left sides of the bushings 20 and 22, urging the forward faces of these bushings into engagement with the side surfaces of the intermeshing gears 15 and 16.

In order to apply loading pressure to the rear surfaces of the axially movable bushings 20 and 22, an annular groove 26 is formed in the forward face of the bushing 20, as shown in Fig. 2, and is connected through a radially extending groove 27 to the outlet side 18 of the pump. Thus, fluid under pressure is applied through the groove 27 to the annular groove 26 and by virtue of the slight clearance between the bushing and the gear, partly due to the film characteristics of the liquid being pumped, there is a leakage from the groove radially inward to an axially extending groove 28 formed in the inner side of the main portion of the bushing 20 and continuing through an axially extended or sleeve portion 30 of the bushing. In some cases, particularly where the fluid being pumped is not of relatively high viscosity, the tolerances normally allowed between gear shaft 31 of the gear 15 and the bushing 20 may provide a sufficient leakage path so that the axial groove 28 may not be necessary. However, under conditions of extreme cold and where the pump may be started dry, there may be a considerable interval of time before such bearing leakage would be sufficient in volume to fill the loading or sealing chambers, as will be hereinafter described. Under such conditions, the groove 28 and corresponding groove 32 associated with the bushing 22 is desirable.

The axially extended portion 30 terminates short of the end wall of bushing bore 13, thus providing an annular pressure or sealing chamber 33. Chamber 33 connects at its upper side, as viewed in Fig. 1, through a short passage 34 to a cylindrical valve chamber 35 in which is disposed a valve disc 36 having an upwardly extending stem 37. Valve chamber 35 has a substantially greater diameter than passage 34 and valve disc 36 normally seats on the upper edge of the passage 34, being urged into this position by helically coiled spring 38 disposed around valve stem 37 and having its lower end in engagement with the upper surface of the disc 36. The upper end of spring 38 bears against the under side of a peripherally threaded cap 39 suitably threaded into the threaded upper portion of valve chamber 35 to permit adjustment of the spring 38.

It will be apparent from the foregoing that liquid at output pressure is applied to the rear terminal surface of the extended portion 30 of bushing 20. In Fig. 3 this area has been designated A-1. Pressure is applied to the rear surface, designated A-2 in Fig. 3, of the flanged or major portion 40 of the bushing 20 from a passageway 41 which connects at one end to the outlet side 18 of the pump, and at its other end to annular pressure or sealing chamber 42, defined by the annular rear surface of the flanged portion 40, the adjacent surface of end closure member 12, the forward peripheral surface extended portion 30 of bushing 20 and the inner surface of the bore 13. In order to prevent leakage from chamber 42 rearwardly between the bushing portion 30 and the closure 12, an O-ring seal 43 is provided and is disposed about the extended portion 30, being received in an annular recess 44 formed in the forward surface of closure 12 at the radially inner side of chamber 42. A second O-ring seal 45 is provided between the shaft 31 and the closure 12 adjacent the left portion thereof, the ring 45 being disposed in annular groove 46 formed in closure 12 at the left of chamber 33.

Liquid under pressure is also applied to the upper end surface of valve stem 37 by means of a passage 47 which extends from chamber 42 to the upper portion of valve chamber 35. Cap 39 has a wide, annular groove 48 formed about the threaded portion thereof and a short passage 49 formed in the cap connects the groove 48 to the upper end of an axially extending bore 50, in which the upper portion of valve stem 37 is slidably journalled. The area of the valve stem end surface is critically selected with reference to the pressure area present at the under side of the disc 36 of the valve so that the pressure area at the terminal end of stem 37 is sufficiently less than the pressure area at the under side of disc 36, so that the valve will tend to open upon the pressure in annular loading chamber 33 exceeding a predetermined value. Valve chamber 35 is vented to inlet pressure through passage 51 connecting to the upper end of arcuate passage 52, as viewed in Fig. 2, and passage 52 extends to the inlet 17 of the pump through an axially extending passage 53. As the loading pressure in chamber 33 reaches a predetermined value, which value may be varied by adjusting spring 38 by rotating cap 39, the valve tends to open and to by-pass fluid to the inlet; thus, the maximum loading pressure on area A-1 may be closely controlled, and if desired kept at a value below that on area A-2.

Referring again to Fig. 1, it will be noted that a passage 54 is formed in closure 12 and connects loading chamber 33, at the lower side thereof, to a chamber 55 defined by the left portion of bore 14 and the left ends of bushing 22 and pump gear 16. Compression spring 25 is disposed in this chamber. Gear 16 has formed therethrough an axial bore 56 which connects chamber 55 to a corresponding chamber 57 provided at the right end of bushing 23. Chamber 57, in turn, is connected through passage 58 formed in the right end wall of housing 11 to a similar chamber 60 provided in the bore 13 at the right end of bushing 21. Thus, it will be apparent that as valve 36 opens at the predetermined pressure level, a flow of fluid under pressure is established from chambers 60, 57, 55 and 33 to the inlet side of the pump. Fluid under pressure leaks between the right end of shaft 31 and bushing 21 because of the clearance provided, and similarly fluid leaking between the bearing portion of gear 16 and bushing 23 is returned to the inlet side of the pump. By establishing this return flow, overheating of the bushings is substantially prevented and improved lubrication of the relatively moving parts obtained, thus making feasible a continuous operation of this pump without danger of damage thereto.

While this invention has been shown in conjunction with flanged or stepped type bushings, it is equally applicable to bushings of the so-called solid type. In Fig. 4 a second embodiment of this invention is illustrated wherein a solid-type bushing 65 is illustrated. With the exception of the reference numeral 65 designating the unstepped bushing, the same reference numerals have been applied to this figure as used in conjunction with Figs. 1, 2 and 3 illustrating the first embodiment of this invention, and it will be understood that the forward surface of bushing 65 is provided with an annular groove 26 similar to that employed for bushing 20 whereby fluid at outlet pressure is applied to the radially inner surface of the bushing and permitted to leak through axially extending groove 28 to the rear surface of the bushing. In this case, however, since there is only one annular loading area provided at the rear surface of the bushing 65, groove 28 is provided primarily to supply fluid for lubricating the shaft 31 with respect to bushing 65, and primary loading pressure is supplied from the passage 41 extending from the outlet 18 to the chamber 42 at the rear of bushing 65. Bushings similar to unstepped bushing 65 will, of course, be supstituted for the other bushings 21, 22, and 23 shown in Fig. 1.

In the operation of this embodiment of the invention, as the loading pressure reaches a predetermined value, valve 36 will tend to open, thus establishing the maximum loading value and at the same time permitting a restricted return flow of fluid to the inlet side of the pump. This return flow of fluid provides lubrication of the relatively moving surfaces and prevents overheating thereof, in addition to establishing the maximum loading value.

Where herein the various parts of this invention have been referred to as being located in a right or a left position, it will be understood that this is done solely for the purpose of facilitating description and that such references relate only to the relative positions of the parts as shown in the accompanying drawings.

While but two embodiments of this invention have been shown and described, many changes and modifications may be made therein without departing from the spirit or scope of the present invention.

What is claimed is:

1. In a liquid pressure-generating pump of the type including a housing containing intermeshing gears, a pressure loadable bushing, a radially extending inner flange portion on said bushing having a first terminal area engageable with a gear side face in pumping seal relation, a second rear surface area on said bushing responsive to liquid pressure for urging said flange in the direction of said gear side face, an outwardly extending tubular portion on said bushing having a smaller diameter than that of said radial flange portion and terminating in a third pressure responsive surface area of said bushing, said third area being also effective in response to liquid pressure to urge said flange in pumping seal direction with said gear side face, means defining a restricted flow path for directing pressure liquid generated by said gears into fluid pressure communication with said second and with said third pressure responsive areas, and means responsive to the value of the pressure acting on said second and third pressure responsive surface areas effective to restrict the value of the pressure acting on said third pressure responsive surface area to a selected, predetermined level below that of the pressure in communication with said second surface area of said flange.

2. A pump according to claim 1 wherein said last named means comprises a control valve assembly including a valve seat communicating with the pressure liquid in contact with said third named pressure responsive terminal surface area, a disc-type valve engageable with said seat against the direction of flow from said third named surface area, a pressure responsive motive surface area on said valve acting to urge said valve in the direction of said seat, the area of said motive surface having a predetermined value less than the area of said valve seat, and means placing said motive surface area in communication with the liquid pressure generated by said gears whereby the value of liquid pressure acting on said third named surface area always bears a predetermined relation to the value of said output pressure, irrespective of variations in the latter.

3. A liquid pressure-generating pump of the intermeshing gear type, including an axially movable bushing, a first surface of said bushing being engageable with a gear side face, flow path defining means for communicating liquid pressure generated by the gears to a second, oppositely disposed surface of said bushing, a differential valve associated with said pump, a first pressure responsive area on said valve, means connecting said first area to the second pressure responsive surface of said bushing, a second and oppositely disposed pressure reponsive area on said valve of greater extent than said first pressure responsive area, means connecting said second pressure responsive area on said valve to the second pressure responsive surface of said bushing, resilient means for normally biasing said valve to closed position, and means defining a return flow path from said second area upon opening of said valve to the inlet side of said pump.

4. A liquid pressure-generating pump of the intermeshing gear type, including a gear side face engaging bushing submerged in the pressure liquid generated by the gears of said pump, a first inner, radially extending pressure responsive surface on said bushing engageable with the adjacent gear side face in pumping seal relation, a second outwardly facing pressure responsive surface on said bushing, restricted flow path defining means for conveying liquid pressure generated by the gears of said pump to said second surface, a pressure responsive differential valve, a first pressure responsive area on said valve, flow path defining means for communicating liquid pressure generated by said gears to said first pressure responsive area on said valve tending to hold said valve in closed position, spring means for biasing said valve normally to closed position, a second oppositely disposed pressure responsive area on said valve of larger extent than said first pressure responsive area, and flow path defining means for applying liquid pressure from said second pressure surface to said second pressure responsive area on said valve tending to open said valve.

5. A liquid pressure-generating pump of the intermeshing gear type, including a gear side face engaging bushing submerged in the pressure liquid generated by the gears of said pump, a first inner, radially extending pressure responsive surface on said bushing engageable with the adjacent gear side face in pumping seal relation, a second outwardly facing pressure responsive surface on said bushing, restricted flow path defining means for conveying liquid pressure generated by the gears of said pump to said second surface, a pressure responsive differential valve, a first pressure responsive area on said valve, flow path defining means for communicating liquid pressure generated by said gears to said first pressure responsive area on said valve to tend to hold said valve in closed position, spring means for biasing said valve normally to closed position, means for varying the force exerted by said biasing means, a second oppositely disposed pressure responsive area on said valve of greater extent than said first pressure responsive area, and flow path defining means for applying liquid pressure from said second pressure surface to said second pressure responsive area on said valve tending to open said valve.

6. In a pump of the class described, an axially adjustable bushing, a first pressure responsive area on said bushing, a second pressure responsive area on said bushing of greater extent than said first pressure responsive area, means for applying loading pressure generated by said pump to said first and second pressure responsive areas, a differential valve, a first pressure responsive area on said valve effective upon application of pressure thereto to tend to close said valve, flow path defining means connecting the second pressure responsive area on said bushing to the first pressure responsive area on said valve, a second pressure responsive area of greater extent than said first valve area on said valve effective upon application of pressure thereto to tend to open said valve, flow path defining means connecting the first pressure responsive area on said bushing to the second pressure responsive area on said valve, and means defining a flow path to an area of lower than loading pressure generated by said pump connecting through said valve when opened to the first pressure responsive area of said bushing.

7. In a pump of the class described, an axially adjustable bushing, a first pressure responsive area on said bushing, a second pressure responsive area on said bushing of greater extent than said first pressure responsive area, a differential valve, a first pressure responsive area on said valve effective upon application of pressure thereto to tend to close said valve, flow path defining means connecting the second pressure responsive area on said bushing to the first pressure responsive area on said valve, a second pressure responsive area of greater extent than said first valve area on said valve effective upon application of pressure thereto to tend to open said valve, flow path defining means connecting the first pressure responsive area on said bushing to the second pressure responsive area on said valve, means defining a flow path to an area of lower than loading pressure generated by said pump connecting through said valve when opened to the first pressure responsive area of said bushing, and adjustable means for normally biasing said differential valve to closed position.

8. A liquid pressure-generating pump of the intermeshing gear type, including a gear side face engaging bushing submerged in the pressure liquid generated by the gears of said pump, a first inner, radially extending pressure responsive surface area on said bushing engageable with an adjacent gear side face in pumping seal relation, a second outwardly facing pressure responsive surface area on said bushing, restricted flow path-defining means for conveying liquid pressure generated by the gears of said pump to said second surface area, a third outwardly facing pressure responsive surface area on said bushing axially spaced from said second area, means for communicating liquid pressure generated by the gears of said pump to said third area to urge said bushing into sealing relation with the adjacent gear side face, and means responsive to the value of the pressure acting on said second and third surfaces, effective to maintain the pressure of the liquid acting upon said second surface area at a value below the value of the pump delivery pressure.

9. A pump according to claim 8 wherein said pressure-maintaining means includes a pressure responsive valve, flow path defining means for communicating liquid pressure generated by said gears to said valve to hold said valve in closed position and flow path defining means for applying liquid pressure from said second surface area to said valve tending to open said valve.

10. A pump of the type including a pair of intermeshing gears, bushing means associated with said gears, the forward faces of said bushings being engageable in sealing relation with said gear side faces, one set of said bushings being axially adjustable with respect to said gears, means for applying loading pressure to the axially adjustable set of said bushings to cause the bushings to engage said gears, a differential valve, a return flow path connecting said valve to the inlet side of said pump, a first pressure responsive area on said valve, means for applying liquid pressure generated by said pump to said first pressure responsive area on said valve to urge said valve to closed position, said last-mentioned means also communicating with said loading pressure on said bushings, a second pressure responsive area on said valve of greater extent than said first pressure responsive area, and means for applying liquid pressure generated by said pump to said second pressure responsive area on said valve to urge said valve to open position, said last-mentioned means also communicating with said loading pressure on said bushings, said return flow path being effective when said valve is open to permit that pressure acting on the second valve area to flow from said bushings to the inlet side of said pump.

JOHN ALFRED LAUCK.

References Cited in the file of this patent

UNITED STATES PATENTS

| Number | Name | Date |
|---|---|---|
| 2,202,913 | Johnson | June 4, 1940 |
| 2,346,761 | Johnson | Apr. 18, 1944 |
| 2,391,072 | Pugh | Dec. 18, 1945 |
| 2,437,791 | Roth et al. | Mar. 16, 1948 |
| 2,444,165 | Lauck | June 29, 1948 |
| 2,470,355 | Lauck | May 17, 1949 |